(12) United States Patent
Roberts

(10) Patent No.: US 7,611,211 B1
(45) Date of Patent: Nov. 3, 2009

(54) ATTACHMENT BRACKET WITH RETAINING CLIP FOR WHEEL SIMULATORS

(75) Inventor: Barry L. Roberts, Cookeville, TN (US)

(73) Assignee: Phoenix USA, Inc., Cookeville, TN (US)

( * ) Notice: Subject to any disclaimer, the term of this patent is extended or adjusted under 35 U.S.C. 154(b) by 68 days.

(21) Appl. No.: 11/923,431

(22) Filed: Oct. 24, 2007

(51) Int. Cl.
  *B60B 7/06* (2006.01)
(52) U.S. Cl. ............. 301/37.31; 301/37.34; 301/37.376
(58) Field of Classification Search ............ 301/37.101, 301/37.102, 37.31, 37.34, 37.371, 37.372, 301/37.373, 37.376, 108.1, 108.4
See application file for complete search history.

(56) References Cited

U.S. PATENT DOCUMENTS

| | | | | | |
|---|---|---|---|---|---|
| 2,037,237 | A | * | 4/1936 | Horn | ........................ 301/108.1 |
| 5,031,965 | A | | 7/1991 | Buerger | |
| 5,340,201 | A | | 8/1994 | Weirs | |
| 5,494,336 | A | | 2/1996 | Russell | |
| 5,503,465 | A | * | 4/1996 | Price et al. | ............. 301/37.374 |
| 5,542,750 | A | | 8/1996 | FitzGerald | |
| 5,630,653 | A | * | 5/1997 | Polka | ..................... 301/37.372 |
| 5,645,324 | A | * | 7/1997 | Wright et al. | .......... 301/37.376 |
| 5,669,672 | A | * | 9/1997 | Wright et al. | .......... 301/37.371 |
| 5,853,228 | A | | 12/1998 | Patti et al. | |
| 6,082,829 | A | | 7/2000 | Chase | |
| 6,254,195 | B1 | | 7/2001 | Plumer | |
| 6,402,253 | B1 | | 6/2002 | Nunes et al. | |
| 6,409,277 | B2 | | 6/2002 | Nunes et al. | |
| 6,485,107 | B2 | | 11/2002 | Hsu et al. | |
| 6,595,596 | B1 | * | 7/2003 | Polka | ..................... 301/37.102 |
| 6,652,036 | B2 | | 11/2003 | Mosher | |
| 6,672,678 | B1 | | 1/2004 | Nunes | |
| 7,059,684 | B1 | * | 6/2006 | Polka | ..................... 301/37.372 |
| 2003/0038529 | A1 | * | 2/2003 | Hsu et al. | .............. 301/37.371 |

* cited by examiner

*Primary Examiner*—Russell D Stormer
(74) *Attorney, Agent, or Firm*—Waddey & Patterson, P.C.; Phillip E. Walker

(57) ABSTRACT

A wheel cover attachment system including a cover for a wheel wherein the wheel includes a plurality of wheel fasteners and a valve stem. The cover comprises a cover circumference, cover axis, an exposed side simulating a wheel, an attachment side opposite the exposed side, at least one cover fastener, and at least one attachment bracket. The attachment bracket is removeably secured to the attachment side and includes a post shaped to accept the cover fastener, first and second concavities, and at least one biasing armature. Each concavity is shaped to accept one of the wheel fasteners and the biasing armature is shaped to engage one of the wheel fasteners in the first concavity and secure the bracket to one of the wheel fasteners.

13 Claims, 6 Drawing Sheets

ATTACHMENT BRACKET WITH RETAINING CLIP FOR WHEEL SIMULATORS

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

All patent and publications described or discussed herein are hereby incorporated by reference in their entirety.

BACKGROUND OF THE INVENTION

The current invention is directed at decorative and protective covers for wheels, or wheel simulators for wheels. More particularly, the current invention is directed at an improved attachment between the wheel simulator and the wheel.

Automobiles are the main form of transportation currently used in the United States. Various efforts have been made in the past to improve the function, use, and appearance of these automobiles both externally and internally. For example, the concept of using covers for wheels for both protective and decorative purposes is known in the art.

Various devices and structures have commonly been used to secure wheel covers to the wheels of vehicles in order to enhance the aesthetic value of the vehicle and apply a level of protection from particles and fluids entering the wheels. Since wheel covers commonly include a large number of parts which require specialized tools in order to affix the covers to the vehicle's wheels. These prior art wheel covers normally require an extended period of time for installation due to the excessive number of parts and lack of familiarity of the user with those parts.

Additionally, certain of these prior art wheel cover systems may require installation with specialized tools, which can complicate the installation process. If the specialized tools are not used correctly, installation may be improper and the cover may detach while the vehicle is in motion or fail to protect the wheel or provide an appeasing aesthetic look. Additionally, any removal, retightening, or resecuring of these prior art wheel cover systems requires the use of the specialized tool. If this specialized tool is not kept with the vehicle and wheel covers, then these prior art wheel covers are not normally removable without damaging or breaking these prior art wheel covers.

Correspondingly, if the tire or wheel with which these prior art wheel covers is damaged, the specialized tool is required for removing the prior art wheel covers in order to access the lug nuts and other vehicle wheel parts located behind the cover. As such, when the automobile which has these prior art special covers is in need of maintenance in the wheel, axle, or brake area, the specialized tool once again is required. Again, absence of the specialized tool during remove of the prior art wheel covers normally results in damage to the prior art wheel covers.

Additionally, there have been other prior art attempts, such as U.S. Pat. Nos. 6,652,036, 6,082,829, 5,542,750, 5,340,201, and 5,031,965 that either require the wheel cover to attach directly under the lug nuts of the wheel or use some type of glue to glue the wheel cover into place. Both of these are typically undesirable. First, there are restrictions and safety issues associated with altering the attachment between the lug nuts and vehicle studs, which attaches the wheel and tire to the axle of the vehicle. As such, any attachment of a wheel cover to the wheel should not base that attachment between the contact face of the lug nuts and the surface of the wheel. Second, there is difficulty associated with the removal of wheel covers that have been glued to the wheel when maintenance is needed in the wheel, brake, tire, and axle areas.

There have still been prior art attempts to make a wheel cover that snaps into place or fits into the peripheral edge of the vehicle wheel. For example, U.S. Pat. Nos. 6,402,253, 6,409,277, and 6,672,678 are directed at wheel covers that include an outer wheel edge clip that is designed to lock into the peripheral edge of the vehicle wheel. These patents have several drawbacks in the fact that each wheel cover must be sized, normally within a small tolerance range, for each wheel to which it is placed. This restricts the use of these wheel covers to retrofit vehicles. Additionally, these wheel covers require the wheel to have an extended outer peripheral edge or have enough lip to engage specific portions of these wheel covers. Once again this can severely limit the types and numbers of wheels to which these wheel covers can be used.

As such, the current available wheel covers and their attachment systems do not provide sufficient aesthetic appeal while facilitating attachment to and removal from the wheel. In addition, the current wheel covers typically require either large assembly times or specialized tools.

What is needed then is a wheel cover and associated attachment system which reduces the number of parts used in order to securely attach the wheel cover to the vehicle. Such a cover and attachment system preferably does not require the use of specialized tools for installation or removal and reduces the number of steps in the installation process and can still maintain a secure attachment of the wheel cover to the vehicle. This needed wheel cover and attachment system is lacking in the art.

BRIEF SUMMARY OF THE INVENTION

Disclosed herein are a wheel cover, a wheel cover attachment system, a wheel cover kit, and method of use thereof for attaching a wheel cover to the wheel of a vehicle. The preferred wheel cover, system, and kit overcome the disadvantages associated with the prior art and includes other advantages over the current art.

The wheel cover attachment system includes a cover for a wheel wherein the wheel includes a plurality of wheel fasteners and a valve stem. The cover comprises a cover circumference, cover axis, an exposed side simulating a wheel, an attachment side opposite the exposed side, at least one cover fastener, and at least one attachment bracket. The attachment bracket is removeably secured to the attachment side and includes a post shaped to accept the cover fastener, first and second concavities, and at least one biasing armature. Each concavity is shaped to accept one of the wheel fasteners and the biasing armature is shaped to engage one of the wheel fasteners in the first concavity and secure the bracket to one of the wheel fasteners.

Preferably the attachment bracket includes first and second armatures wherein the first armature independently engages one of the wheel fasteners in the first cavity and the second armature independently engages one of the wheel fasteners in the second cavity. The attachment bracket can include an open side and a closed side wherein the first and second concavities open to the open side. The biasing armatures can include a pivot end and a securing end. The pivot end pivotally engages the open side of the attachment bracket while the securing end removeably engages the closed side of the attachment bracket. A notch can be positioned on the closed side and shaped to accept a securing end of one of the biasing armatures.

The attached bracket can be positioned between two wheel fasteners such that one wheel fastener is positioned in each concavity. The cover can include at least one aperture shape to allow the valve stem to be accessed through that aperture for maintenance of the tire. The post and the fastener can be shaped to removeably secure the cover to the attachment bracket.

Also included is an attachment bracket for attaching a wheel simulator to a wheel. The wheel simulator includes an exposed side simulating a wheel, an attachment side opposite the exposed side, and a plurality of cover fasteners. The wheel includes a plurality of wheel fasteners. The attachment bracket comprises a column, or post, shaped to accept one of the cover fasteners, first and second concavities, and first and second armatures. Each concavity can be shaped to accept one of the wheel fasteners and can be positioned either on a first side or a second side of the column. Each armature can be shaped to independently accept one of the wheel fasteners in one of the concavities and can be positioned to secure one of the first or second sides of the attachment bracket to one of the wheel fasteners.

The bracket can further include an open side and a closed side wherein the first and second concavities open to the open side. Each armature includes a pivot end and a securing end wherein each pivot end pivotally engages the open side and is preferably positioned proximate to the column while each securing end is removeably engaged to the closing side. Each closing side can further include a connection location spaced from the column and shaped to accept the securing end of one of the armatures.

It is therefore a general object of the present invention to provide an improved wheel simulator for a wheel.

Another object of the present invention is to provide an improved attachment system for a wheel simulator for a wheel.

Still another object of the present invention is to provide an improved attachment system for a wheel simulator that can be adapted to fit various wheels and to properly fit that wheel and not interfere with the structure and function of that wheel.

Yet another object of the present invention is to provide an improved attachment system for a wheel simulator that can be adapted to fit various wheels not interfere with any wheel weights positioned on that wheel.

Yet still another object of the present invention is to provide an improved attachment system for a wheel simulator that can attach to the wheel fasteners of a wheel without interfering with the attachment of those wheel fasteners to the wheel.

Still another object of the present invention is to provide an improved attachment system for a wheel simulator that engages the offset designed into the wheel fasteners of the original equipment manufacturer of those wheel fasteners.

Other and further objects, features and advantages of the present invention will be readily apparent to those skilled in the art upon reading of the following disclosure when taken in conjunction with the accompanying drawings.

BRIEF DESCRIPTION OF THE SEVERAL VIEWS OF THE DRAWINGS

FIG. 4 shows biased armatures in a closed position.

FIG. 5 shows the armatures in an open position.

FIG. 7 shows the armatures in a closed position.

FIG. 8 shows the armature in a closed position.

DETAILED DESCRIPTION OF THE INVENTION

Figure 1:
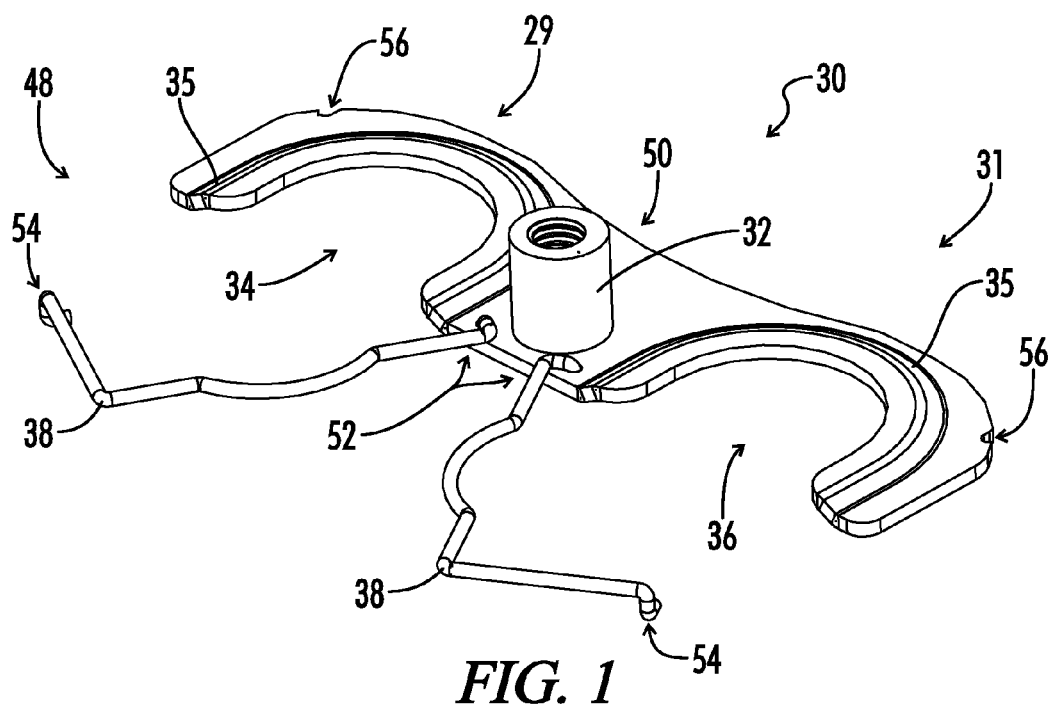
FIG. 1 is an isometric top view of an attachment bracket made in accordance with the current disclosure.
Figure 2:
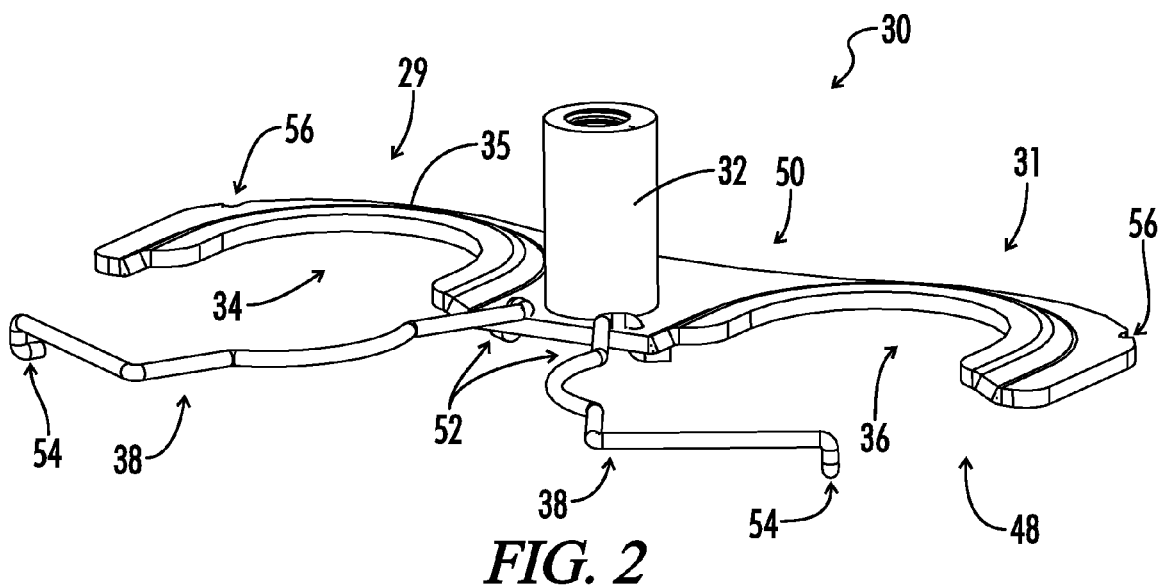
FIG. 2 is an isometric front view of an attachment bracket made in accordance with the current disclosure.
Figure 3:
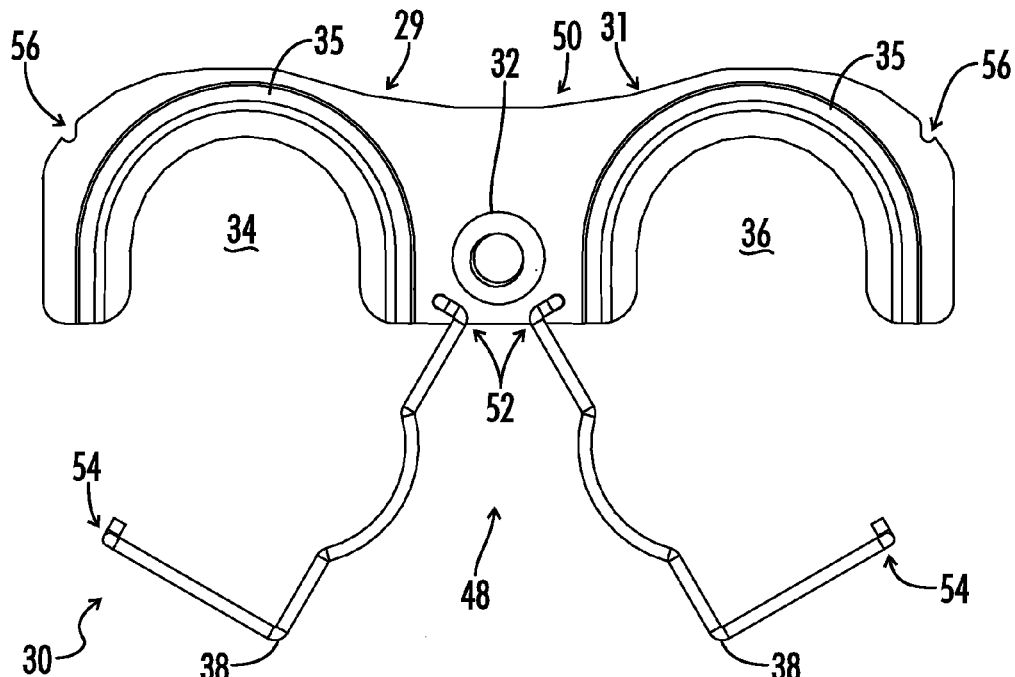
FIG. 3 is a top view of an attachment bracket made in accordance with the current disclosure.
Figure 4:
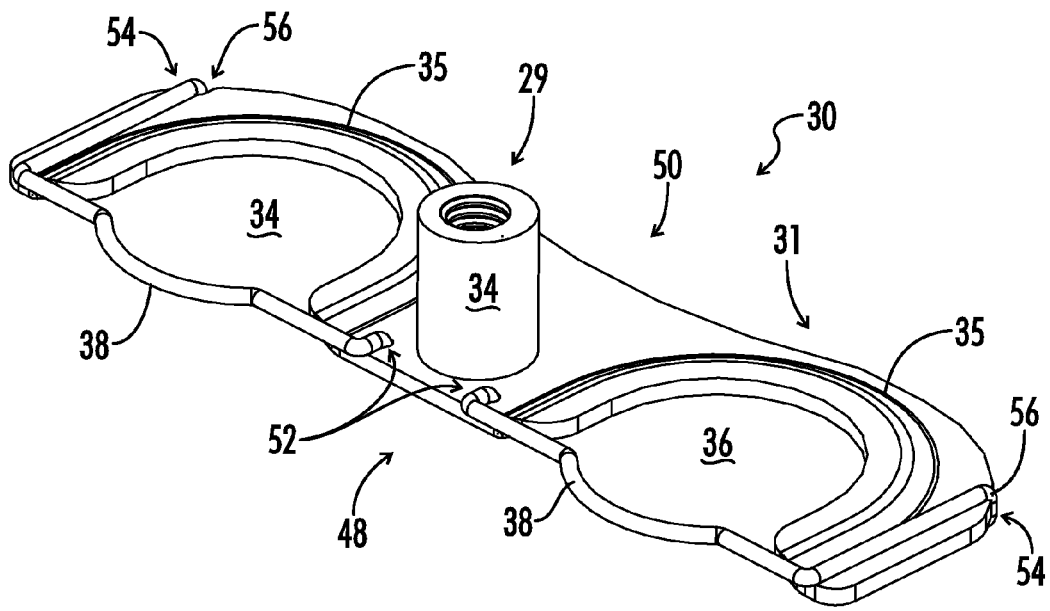
FIG. 4 is an isometric top view similar to FIG. 1.
Figure 5:
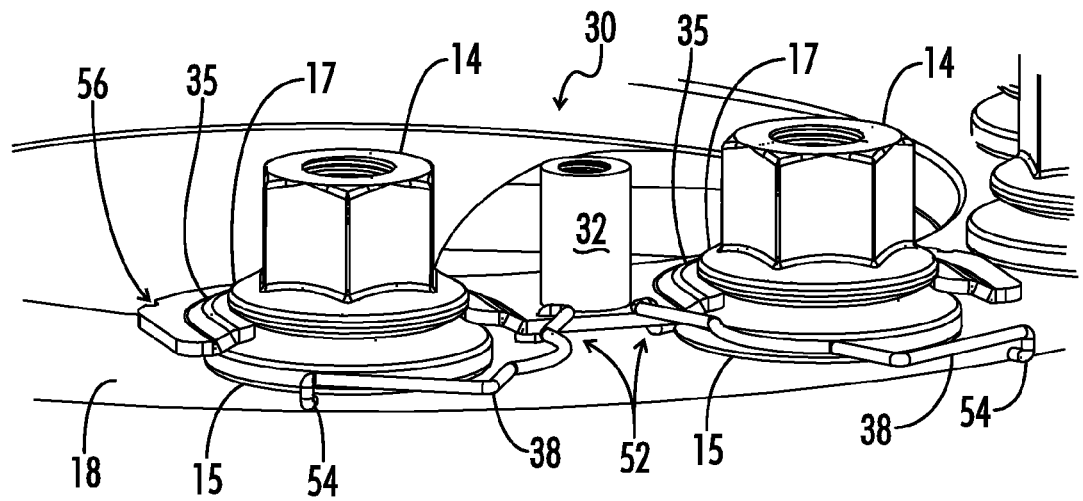
FIG. 5 is an isometric view of an attachment bracket positioned around wheel fasteners of a wheel.
Figure 6:
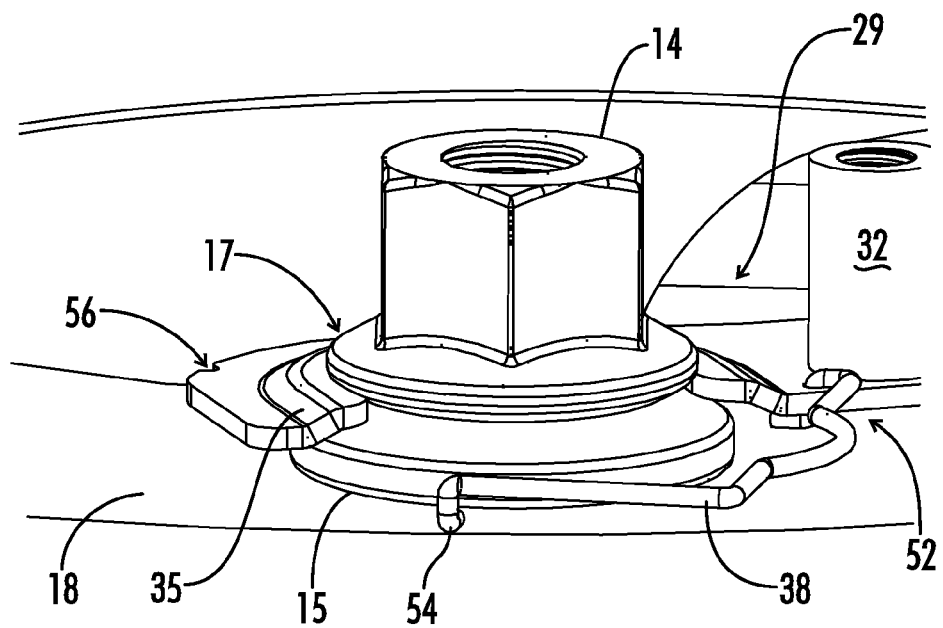
FIG. 6 is a detailed view of a portion of a bracket made in accordance with the current disclosure showing a wheel fastener positioned in one of the cavities and the armature in an open position.
Figure 7:
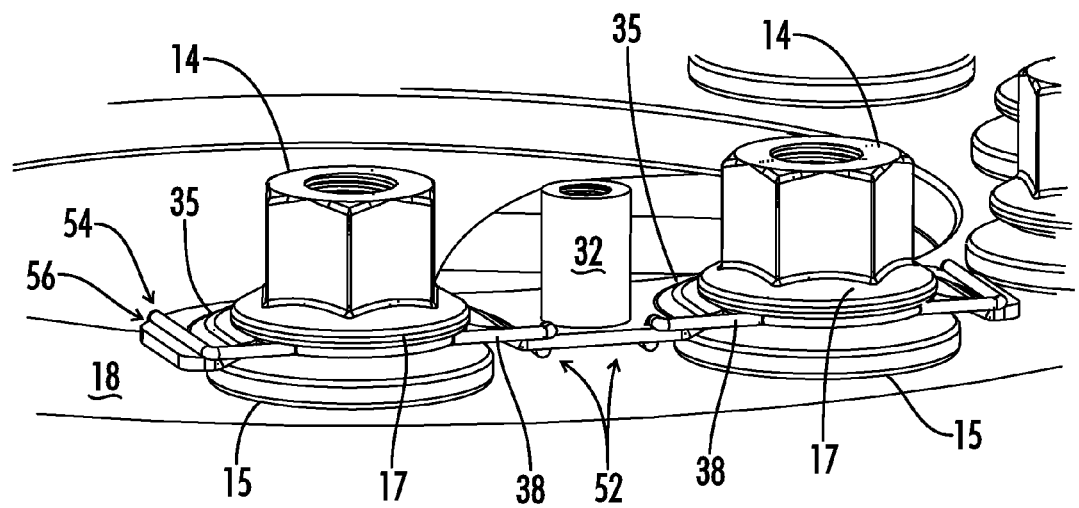
FIG. 7 is a view similar to FIG. 5.
Figure 8:
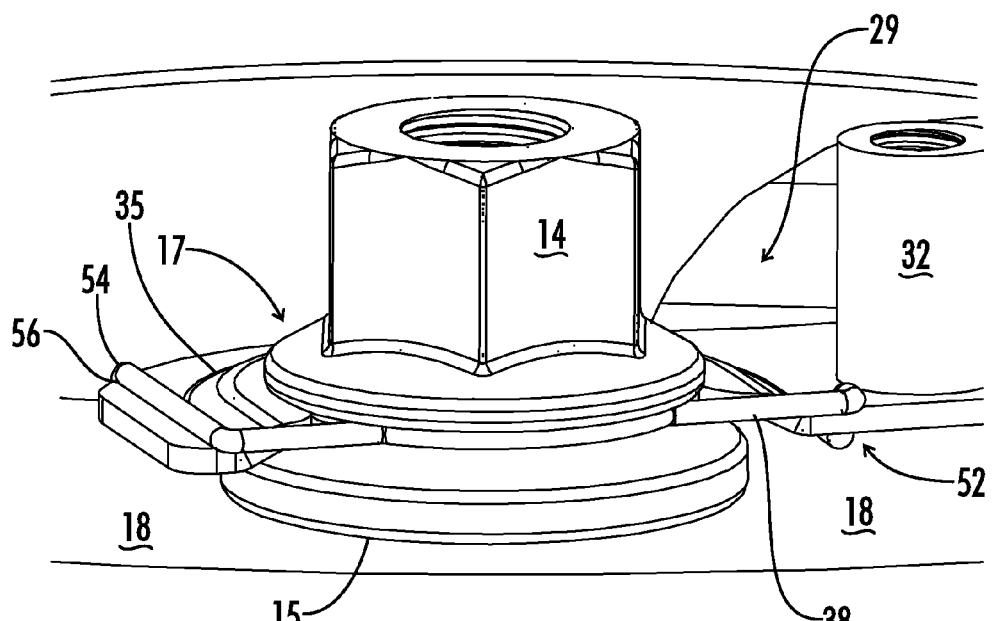
FIG. 8 is a view similar to FIG. 6.
Figure 9:
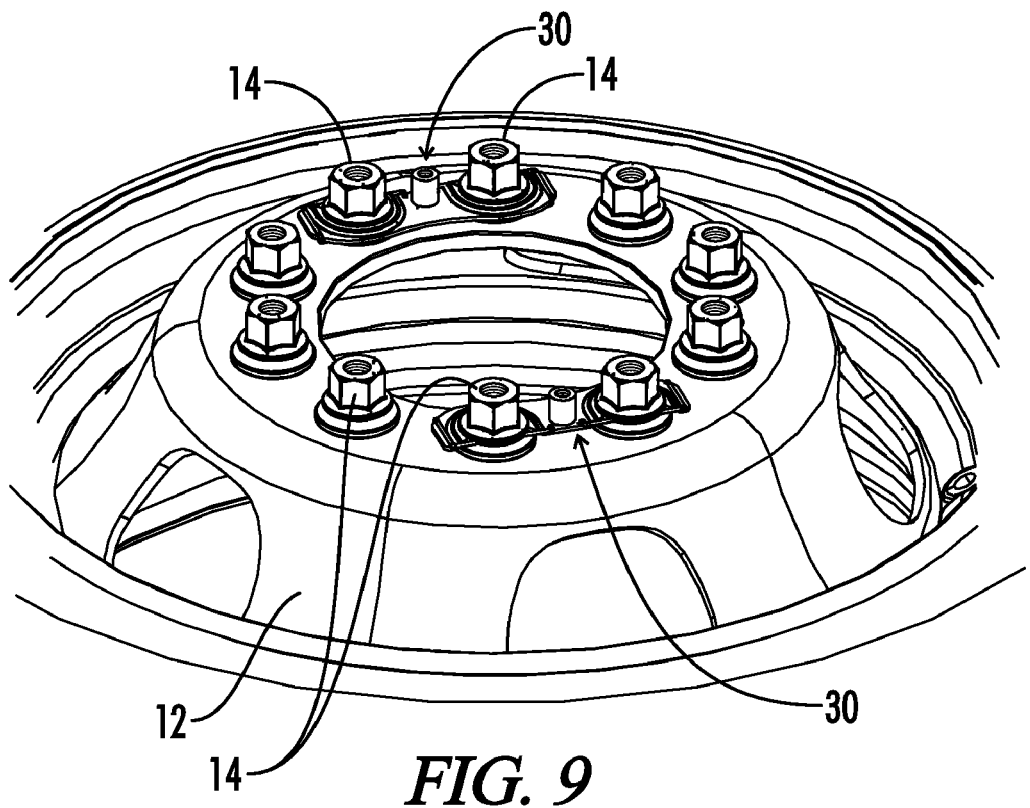
FIG. 9 is a partial top perspective view showing a pair of brackets positioned on wheel fasteners on a wheel.
Figure 10:
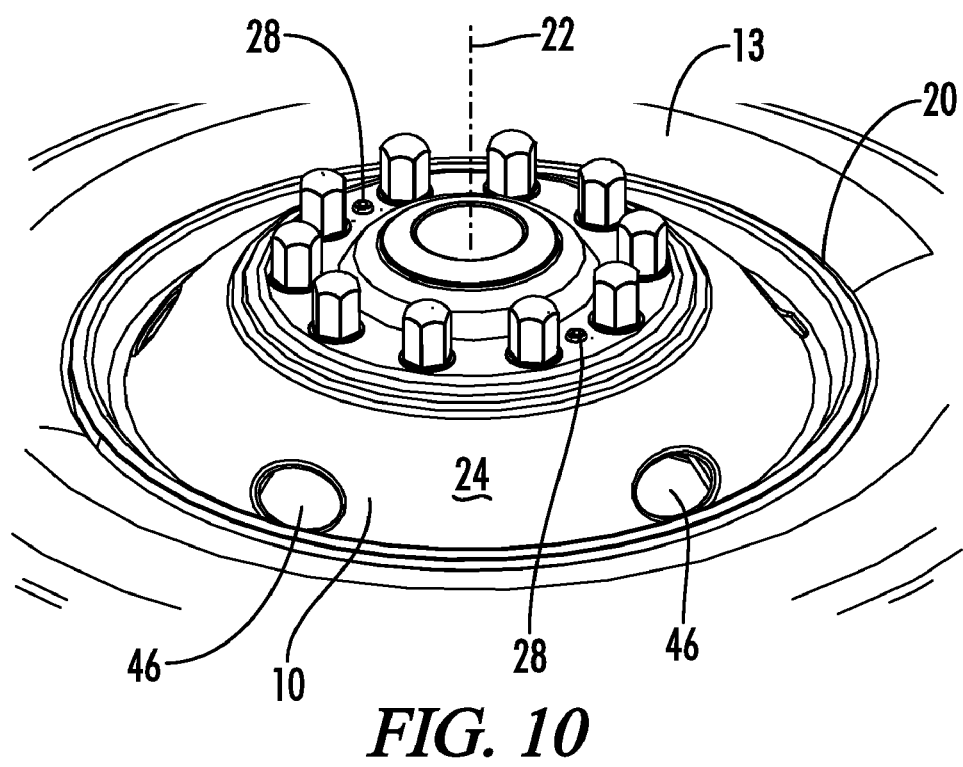
FIG. 10 is a top isometric view showing a cover made in accordance with the current disclosure attached to a wheel.
Figure 11:
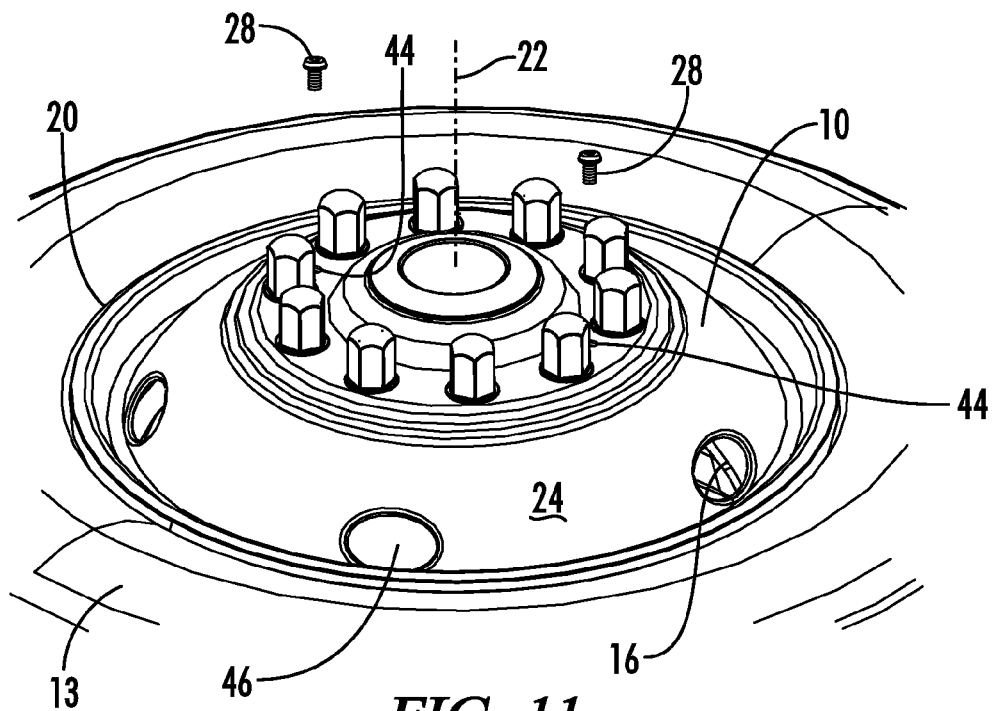
FIG. 11 is a partial expanded view of FIG. 10.
Figure 12:
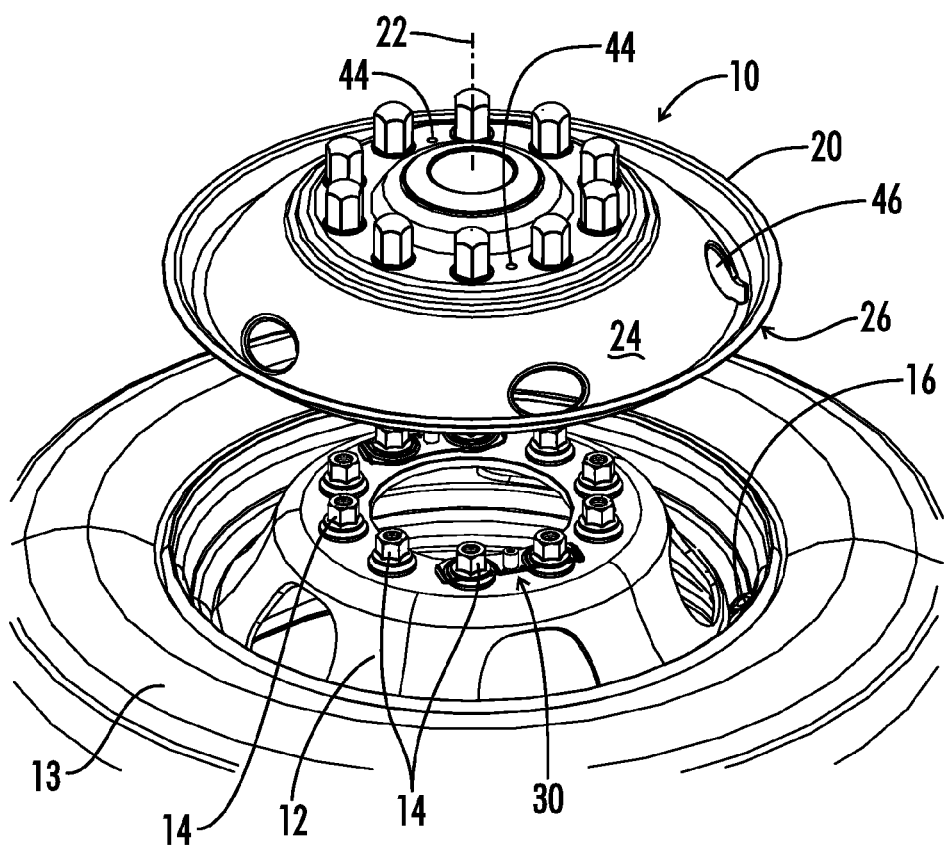
FIG. 12 is a partial expanded view of FIG. 10.

Referring generally now to FIGS. 1-12, a cover or wheel simulator is shown and generally designated by the numeral 10. The cover 10 is for a wheel 12, which can also be described as a rim 12, which includes a plurality of wheel fasteners 14 and a valve stem 16. The wheel fasteners 14, which can, for example, be lug nuts or axle nuts, typically engage a contact face 18 of the wheel 12. This is best exampled in FIGS. 5-9. The wheel fasteners 14 are used to attach the wheel 12 and the associated tire 13 to the axle area of a vehicle.

The cover 10 comprises a cover circumference 20, a cover axis 22, an exposed side 24, an attachment side 26, at least one cover fastener 28, and at least one attachment bracket 30. The exposed side 24 simulates a wheel. More specifically the exposed side 24 can have various coatings to simulate a preferred finish to a wheel. The exposed side 24 can have the appearance, from the perspective of a viewer of the cover 10 as it is attached to the wheel 12, that the wheel 12 has an aesthetically pleasing appearance. For example, the exposed side 24 can simulate or mimic a chrome finish or other various designs that are aesthetically pleasing. Additionally, the cover 10 can include a cover fastener opening 44 facilitating the secured attachment of the cover 10 to the bracket 30.

The attachment side 26 is positioned opposite the exposed side 24 and is the side of the cover 10 that faces the wheel 12 when the cover 10 is attached to the wheel 12. The attachment side 26 can mimic the general shape of the exposed side 24 and can be designed with or without special coatings or sheens.

The attachment bracket 30 is removeably secured to the attachment side 26 of the cover 10 and the wheel fasteners 14, proximate the contact face 18, of the wheel 12. The attachment bracket includes a post 32, a first concavity 34, a second concavity 36 and at least one biasing armature 38. The post 32, which can also be described as a stanchion 32 or column 32, is shaped to accept the cover fasteners 28. Each concavity 34 and 36 is shaped to accept one of the wheel fasteners 14 while the armature 38 is shaped to engage one of the wheel fasteners 14 in one of the concavities 34 or 36 to secure the bracket 30 to the wheel fastener 14.

The wheel fasteners 14 are normally affixed to the vehicle studs extending from the axle of the vehicle. The securement and engagement between the wheel fasteners 14 and those vehicle studs is important in the proper securement of the wheel 12 to the axle of the vehicle and the positioning of the tire 13 in relation to the vehicle for proper operation of the vehicle. As such, a portion of the wheel fasteners 14, namely the wheel fastener base 15, should preferably directly engage the contact face 18 of the wheel 12.

The current inventive attachment bracket 30 is designed to engage and secure to the wheel fasteners 14 independent of the engagement between the wheel fasteners 14 and the contact face 18. Namely, the attachment brackets 30 are designed to engage the wheel fasteners 14 at an offset location 17 spaced from the wheel fastener base 15. This facilitates the proper contact between the wheel fasteners 14 and contact face 18 while facilitating securement of the attachment bracket 30 and ultimately the cover 10 to the wheel 12. The attachment bracket 30 is preferably positioned between two wheel fasteners 14.

The number of attachment brackets 30 can vary according to preference. In a preferred embodiment there are at least two attachment brackets 30, while alternately there can be three, four, five or more attachment brackets 30. The attachment brackets 30 peripherally engage one or more wheel fasteners 14 used to secure the wheel 12 to the vehicle and can be spaced around the contact face 18.

The attachment bracket 30 can further include first and second armatures 38, which can also be described as spring wire retaining clips. The first armature 38 can independently engage one of the wheel fasteners 14 in the first concavity 34 while the second armature 38 can independently engage one of the wheel fasteners 14 in the second concavity 36. Alternately described the spring wire retaining clips 38 can snap around the lug nuts 14 to secure the bracket 30 to the lug nuts 14.

The post 32 and cover fastener 28 are shaped to removeably secure the cover 10 to the attachment bracket 30. The post 32 can be internally threaded while the cover fastener 28 can be externally threaded. The cover fastener 28 can be shaped to pass through the cover fastener opening 44 and engage the internal threads on the post 32. The cover fasteners 28 can be those fasteners known in the art such as screws, nuts and bolts, and the like and a preferred embodiment are a screw that is threaded into the post 32. The cover fastener 28 can be attached or removed by a standard tool, such as a screw driver, wrench, or Allen wrench, in order to secure the cover fastener 28 into the post 32 thereby securing the cover 10 to the attachment bracket 30 and ultimately the wheel 12. Alternately, the post 32 can be shaped to pass through the cover fastener opening 44 and secured to the exposed side 24 of the cover 10 to the bracket 30.

The cover 10 can include apertures 46, which can also be described as openings 46, which extend from the exposed side 24 through to the attachment side 26. At least one of the apertures 46 can be shaped to allow the valve stem 16 to extend through that aperture. Alternately, the aperture 46 can be shaped to allow increased access to the valve stem 16 for maintenance of the wheel 12 and/or tire 13. The apertures 46 can be substantially uniform in shape and still allow access to the valve stem 16.

The attachment bracket 30 can further include an open side 48 and a closed side 50 wherein the first and second concavities 34 and 36 open to the open side 48. The armatures 38 include a pivot end 52 and a securing end 54 wherein the pivot end 52 for each armature 38 engages the open side 48 proximate the post 32 and each securing end 54 removably engages the closed side 50. The closed side 50 includes a connection location 56 including a notch that is spaced from the post 32 and shaped to accept the securing end 54 of one of the armatures 38.

The first concavity 34 can be described as being positioned on the first side 29 of the attachment bracket 30 while the second concavity 36 can be described as being on the second side 31 of the attachment bracket 30. As best illustrated in FIGS. 5-8, each side 29 or 31 of the attachment bracket 30 can include an arcuate shape. The arcuate shape can be designed to contour to the offset location 17 of the wheel fastener 14 to facilitate a better engagement between the first or second concavity 34 or 36 and the wheel fastener 14. Additionally, each concavity 34 or 36 can include multiple sides 35 positioned in multiple planes to facilitate engagement between the concavities 34 or 36 and the wheel fasteners 14. These multiple sides 13 can reinforce the concavities 34 and 36 and be positioned to follow the contour of the offset location 17.

A feature of the inventive attachment bracket 30 is the adaptive nature of the biasing armatures 38 to form around various wheel fasteners 14. The armatures 38 can be closed around the offset location 17 of a wheel fastener 14 such that the armatures 38 are biased against the wheel fasteners 14 to secure the wheel fasteners 14 in the concavities 34 or 36.

The attachment bracket 30 is designed to provide no substantial interference and preferably no interference at all to the engagement between the wheel fasteners 14 and the wheel 12. Additionally, the attachment bracket 30 can be small and lightweight in nature such that the balance of the wheel is substantially unaffected.

The inventive design of the cover 10 and attachment bracket 30 are such that the wheel cover 10 attached to the wheel 12 without interfering with any wheel weights positioned on the wheel since the wheel weights are typically around the peripheral edge of a wheel 12. The cover circumference 20 does not need to directly engage the wheel 12 and any associated weights on the wheel 12.

The current invention can allow for both concave and convex designs. For example, the wheel cover 10 can be both concave and convex in nature to substantially match various wheel designs with internally concave or internally convex shapes.

Thus, although there have been described particular embodiments of the present invention of a new and useful Attachment Bracket with Retaining Clips for Wheel Simulators, it is not intended that such references be construed as limitations upon the scope of this invention except as set forth in the following claims.

What is claimed is:

1. A cover for a wheel having a plurality of wheel fasteners, the cover comprising:

an exposed side simulating a wheel;

an attachment side opposite the exposed surface;

at least one cover fastener; and at least one attachment bracket, the at least one attachment bracket removably secured to the attachment surface and including:

a post shaped to accept the at least one cover fastener;

first and second concavities, each concavity shaped to accept one of the wheel fasteners;

at least one biasing armature shaped to engage one of the wheel fasteners in the first concavity and secure the bracket to one of the wheel fasteners;

an open side and a closed side, the first and second concavities opening to the open side; and wherein the at least one biasing armature includes a pivot end and a securing end, the pivot end pivotally engages the open side and the securing end removably engages the closed side.

2. The cover of claim 1, the attachment bracket further including first and second armatures, the first armature independently engaging one of the wheel fasteners in the first concavity and second armature independently engaging one of the wheel fasteners in the second concavity.

3. The cover of claim 1, wherein the wheel includes a valve stem and the cover includes at least one aperture shaped to allow access to the valve stem.

4. The cover of claim 1, wherein the post and the at least one cover fastener are shaped to removably secure the cover to the at least one attachment bracket.

5. The cover of claim 4, further including at least one cover fastener opening extending through the cover, wherein the post is internally threaded and the at least one cover fastener is externally threaded and shaped to pass through the at least one cover fastener opening.

6. The cover of claim 1, the closed side including a notch shaped and positioned to accept the securing end of the at least one biasing armature.

7. The cover of claim 1, wherein the at least one attachment bracket is substantially positioned between two wheel fasteners.

8. A cover for a wheel having a plurality of wheel fasteners, the cover comprising:
    an exposed side simulating a wheel;
    an attachment side opposite the exposed side;
    a plurality of cover fasteners; and
    a plurality of attachment brackets, each attachment bracket removably secured to the attachment surface and including:
        a stanchion shaped to accept one of the cover fasteners;
        first and second concavities, each concavity shaped to accept one of the wheel fasteners;
        an open side and a closed side, the first and second concavities opening to the open side;
        a first armature shaped to independently engage one of the wheel fasteners in the first concavity and positioned to secure said attachment bracket to said wheel fastener;
        a second armature shaped to independently engage one of the wheel fasteners in the second concavity and positioned to secure said attachment bracket to said wheel fastener; and
        each biasing armature including a pivot end and a securing end, each pivot end pivotally engaging the open side and each securing end removably engaging the closed side.

9. The cover of claim 8, each closed side including a notch shaped and positioned to accept the securing end of one of the biasing armatures.

10. The cover of claim 8, wherein at least one of the cover fasteners and the stanchion on at least one of the attachment brackets are shaped to removably secure the cover to said attachment bracket.

11. The cover of claim 10, further including a plurality of cover fastener openings extending through the cover, wherein each stanchion is internally threaded and each cover fastener is externally threaded and shaped to pass through one of the cover fastener openings and engage one of the stanchions.

12. An attachment bracket for attaching a wheel simulator to a wheel, the wheel simulator including an exposed side simulating a wheel, an attachment side opposite the exposed side, and at least one cover fastener, the wheel including a plurality of wheel fasteners, the attachment bracket comprising:
    a column shaped to accept the one of the cover fasteners;
    a first concavity shaped to accept one of the wheel fasteners and positioned on a first side of the column;
    a second concavity shaped to accept one of the wheel fasteners and positioned on a second side of the column;
    a first armature shaped to independently accept one of the wheel fasteners in the first concavity and positioned to secure the first side of the attachment bracket to one of the wheel fasteners;
    a second armature shaped to independently accept one of the wheel fasteners in the second concavity and positioned to secure the second side of the attachment bracket to one of the wheel fasteners;
    an open side and a closed side, the first and second concavities opening to the open side; and
    each armature including a pivot end and a securing end, each pivot end pivotally engaging the open side and positioned proximate the column and each securing end removably engaging the closed side.

13. The attachment bracket of claim 12, each closed side including a connection location spaced from the column and shaped to accept the securing end of one of the armatures.

* * * * *